Patented Dec. 5, 1933

1,938,512

UNITED STATES PATENT OFFICE 1,938,512

PROCESS FOR THE MANUFACTURE OF SALTS OF ORGANIC ACIDS FROM ALBUMINOIDS AND THE LIKE

Karl Bromig, Frankfort-on-the-Main, Germany

No Drawing. Application April 26, 1929, Serial No. 358,436, and in Germany April 27, 1928

2 Claims. (Cl. 260—119)

This invention relates to the production of organic acids from albumen, proteins of animal or vegetable origin, from albuminous products, decomposition products of albumen and the like. The mixtures of salts of organic acids obtained in accordance with the well known processes from the above mentioned starting materials are darkly coloured, pasty substances. According to my invention I am able to obtain the said mixtures of salts which can be produced from albumen or such like starting materials in a pulverulent state so that the powder does not stick together and can easily be scattered about. This is of great importance when the mixtures of such salts are intended for use as substitute for spicing victuals for human consumption, for instance where the use of common salt is, for medical reasons, prohibited.

In carrying out my invention I digest starting materials, such as proteins, gluten, casein, offals, barley germ, gelatine, boneglue or the like, with mineral acids at boiling point until they are decomposed with formation of amino acids of lower molecular weight. The mineral acids are then removed and the amino acids converted into their salts by neutralization and the mixture of these salts is obtained from the solution by following gentle methods, for instance, evaporation in vacuo at low temperatures, removal of the water by atomization or the like.

By using this method I am able to obtain complex mixtures of salts of the various amino acids and other organic acids in pulverulent form of high value. In order to obtain this aim I adapt the working conditions as regards concentration of acids used, heating temperatures, duration of heating and the like to the various starting materials and, also, to the different products which I want to produce.

I have found through experiments that good results may be obtained by using about 1000 to 2000 grs. sulfuric acid in the form of a 20 to 30% solution for each 100 grs. of nitrogen in the form of nitrogenous matter. I use for instance 5000 cc. of a 20% sulfuric acid for an amount of albumenous material which contains 100 grs. of nitrogen. The heating process may be carried out at ordinary, at increased or, if necessary, at reduced pressure. The duration of heating depends also upon the starting material and the other working conditions, for instance boiling without pressure or boiling at increased pressure. When utilizing albumenous matters, such as casein, good results have been obtained for instance by employing 5000 cc. of a 20% sulfuric acid solution and 100 grs. of nitrogen contents and boiling for 3 to 5 hours in an open vessel or for one hour in a closed pan at 2 atm. When using offals or the like as starting material I have found it useful to boil in an open vessel for 5 to 8 hours and when boiling at 2 atm. of pressure for about 2 hours.

Having ascertained that it is possible to obtain highly complex mixtures of amino acids or their salts respectively from albumenous matters in a pulverulent state and having found out that the result depends solely upon the above named working conditions, anyone skilled in the art will be able to obtain like results from all sorts of albumenous materials by slightly altering these conditions, and it requires only a short investigation and few experiments to ascertain in each case the conditions most favorable for the respective starting material.

Generally speaking, the method for obtaining these results consists in treating the starting material with the necessary quantity of acid at a suitable concentration and subjecting it to the boiling process under the above named conditions. Thereafter the amino acids are neutralized, for instance, with soda lye, after the mineral acid has been previously removed, and by evaporating the solution in vacuo at reduced temperatures, whereupon the salts of the amino acids are obtained as a dry powder which can be easily strewn.

*Example 1*

100 kgs. offals are boiled for 8 hours with 600 liters of sulfuric acid (25%) in an open pan. When this solution is cold the sulfuric acid is removed in the form of $CaSO_4$ by precipitation with lime and the filtrate neutralized by means of sodium hydroxide. This solution is then taken down to about 200 to 250 liters. Calciumsulfate which might deposit during the evaporation process is filtered off and the filtrate is treated with 1.5 kgs. of decolorizing carbon. The solution which has a slight yellow colour is evaporated in vacuo at 50 to 60° centrigrade, whereupon the sodium salts of the amino acids are obtained in the form of powder.

*Example 2*

100 kgs. of malting barley are boiled for 8 hours with 800 liters of 20% sulfuric acid solution. After cooling 90% of the sulfuric acid is precipitated by calcium hydroxide, the calciumsulfate formed is filtered off and the filtrate neutralized with sodium hydroxide. The solution is then boiled down in vacuo to 400 liters.

The amount of sulfuric acid still present is precipitated with calcium formate and the filtrate treated with 1 kg. of decolorizing carbon. When the slightly yellow solution is evaporated in vacuo the sodium salts of the amino acid mixture are obtained in a powdery form.

According to one manner of carrying my invention into effect I add to the salt mixtures, which are obtained by neutralizing the amino acids formed from the nitrogenous starting materials, other salts of organic acids, for instance of formic acid and work up the mixture thus obtained in the way above described.

What I claim is:

1. A process for the manufacture of pulverulent mixtures of salts of amino acids which comprises the steps of digesting albuminous material with sulphuric acid until said material is decomposed into amino acids of low molecular weight, adding to the resulting solution a calcium compound in an amount substantially equal to that amount necessary to precipitate the sulphuric acid therefrom as calcium sulphate, filtering to remove the calcium sulphate, neutralizing the resulting neutral filtrate with decolorizing carbon and then evaporating to recover the dry pulverulent mixture of salts.

2. A process for the manufacture of pulverulent mixtures of salts of amino acids which comprises the steps of digesting albuminous material with dilute sulphuric acid until said material is decomposed into amino acids of low molecular weight, adding to the resulting solution a calcium compound in an amount substantially equal to that amount necessary to precipitate the sulphuric acid therefrom as calcium sulphate, filtering to remove the calcium sulphate, neutralizing the filtrate with sodium hydroxide, decolorizing the resulting neutral filtrate with decolorizing carbon and removing water from the filtrate by evaporation in vacuo.

KARL BROMIG.